(12) United States Patent
Jaffee et al.

(10) Patent No.: US 6,187,697 B1
(45) Date of Patent: Feb. 13, 2001

(54) MULTIPLE LAYER NONWOVEN MAT AND LAMINATE

(76) Inventors: Alan Michael Jaffee, 822 Touraine Ave., Bowling Green, OH (US) 43402; Richard Emil Kajander, 331 N. Dulton Dr., Toledo, OH (US) 43615

( * ) Notice: Under 35 U.S.C. 154(b), the term of this patent shall be extended for 0 days.

(21) Appl. No.: 09/224,391

(22) Filed: Dec. 31, 1998

(51) Int. Cl.[7] .................. B32B 27/04; B32B 27/12; B32B 5/02
(52) U.S. Cl. .................. 442/149; 442/150; 442/415; 442/417
(58) Field of Search .................. 442/149, 150, 442/415, 417

(56) References Cited

U.S. PATENT DOCUMENTS

| | | | |
|---|---|---|---|
| 4,258,098 | * 3/1981 | Bondoc et al. | 428/288 |
| 4,318,774 | 3/1982 | Powell et al. | 162/129 |
| 4,425,399 | 1/1984 | Bershas | 428/288 |
| 4,647,496 | 3/1987 | Lehnert et al. | 428/251 |
| 4,810,569 | 3/1989 | Lehnert et al. | 428/285 |
| 5,110,873 | * 5/1992 | Kono et al. | 525/305 |
| 5,338,340 | * 8/1994 | Kasmark, Jr. et al. | 96/135 |
| 5,342,680 | 8/1994 | Randall | 428/285 |
| 5,704,179 | 1/1998 | Lehnert et al. | 52/408 |
| 5,744,229 | 4/1998 | Gleason et al. | 428/297.4 |
| 5,772,846 | 6/1998 | Jaffee | 162/145 |
| 5,851,933 | * 12/1998 | Swartz et al. | 442/180 |
| 5,853,628 | * 12/1998 | Varona | 264/6 |
| 5,883,024 | 3/1999 | Haver-Smith et al. | 442/333 |
| 5,981,406 | * 11/1999 | Randall | 442/71 |

FOREIGN PATENT DOCUMENTS

| | | |
|---|---|---|
| 0148760 | 7/1985 | (EP) . |
| 0148761 | 7/1985 | (EP) . |

* cited by examiner

Primary Examiner—Terrel Morris
Assistant Examiner—Norca L. Torres
(74) Attorney, Agent, or Firm—John H. Miller

(57) ABSTRACT

The invention includes fibrous nonwoven multiple layer mats having at least two layers with a body portion layer and a surface portion layer having fine fibers and/or particles therein, both layers being bonded together and to each other with a same resin binder. Preferably most or essentially all of the particles and/or fibers in the surface layer are larger than openings between the fibers in the body portion of the mat. The mats produced according to this invention are useful as a facer for all types of boards such as wood boards, wood product boards, insulating boards and hard boards of all types, and also as reinforcement and dimensional stabilizers for making a large number of novel laminate products and for a myriad of other uses. These mats are made on a wet laid nonwoven mat machine with a modification to the binder preparation system, an inventive step in the preparation of the binder and in the selection of ingredients for a binder slurry.

8 Claims, 2 Drawing Sheets

MULTIPLE LAYER NONWOVEN MAT AND LAMINATE

The present invention involves fibrous nonwoven mats having at least two layers with a surface layer having fine fibers and/or particles therein, both layers being well bonded together and to each other with a same resin binder. The mats produced according to this invention are useful as a facer for all types of boards such as wood boards, wood product boards, insulating boards and hard boards of all types, and also as reinforcement and dimensional stabilizers for making a large number of laminate products and for a myriad of other uses. These mats are made on a conventional wet laid nonwoven mat machine except for a modification to the binder preparation system, an inventive step in the preparation of the binder and in the selection of ingredients for a binder slurry.

It is known to make nonwoven fibrous mats from fibers, such as glass, polyester, polypropylene, polyethylene, cellulose, ceramic and many other types of fibers, and to bond these fibers together into mats with a thermosetting or thermoplastic resin binder, like urea formaldehyde, acrylic, melamine formaldehyde with or without urea additions, polyvinyl acetate and other resins, or mixtures thereof to make fibrous nonwoven mats. Such mats are used to make a myriad of roofing, building and automotive products. It is also known to use an acrylic copolymer latex, such as a self-cross linking acrylic copolymer of an anionic emulsifying type as one component of at least a two component binder for bonding glass fibers and particulate thermoplastic to make a glass fiber reinforced sheet that can later be hot molded into various shapes and articles, as disclosed in U.S. Pat. No. 5,393,379. It is also known to face gypsum board with fibrous nonwoven mats as disclosed in U.S. Pat. Nos. 5,772,846 and 4,647,496.

It is also known to add particles of thermoplastic resin to an aqueous fiber slurry used to make a mat that can later be hot stamped or thermoformed. When this is done, the resulting nonwoven mat is uniform throughout its thickness. Examples of nonwoven fiber glass mat containing particles of thermoplastic like polyvinyl chloride, polypropylene, etc. are disclosed in published European Patent Applications 0148760 and 0148761. In EP 0148760 the mat is bound together with aqueous binders like polyvinyl alcohol, starch, phenol formaldehyde, etc. According to the disclosures of both these EP applications the particulate thermoplastic component(s) is present in the mat in amounts of 40–80 percent by weight, and the mat is subjected to elevated temperature and pressure to fuse and consolidate the thermoplastic particles into a continuous thermoplastic matrix reinforced with glass fibers. Such mats would not be suitable as a facing for the insulating gypsum board product, such as the board disclosed in U.S. Pat. No. 4,647,496.

One surface of fibrous nonwoven mats made on a wet laid mat machine having no coating equipment thereon usually differs slightly from the opposite surface due to binder migration and/or one side laying on a wire belt while the other side is fully exposed and not in physical contact with any confining article during forming and drying. Nevertheless, the two sides are fairly similar in permeability and smoothness and both sides have fibers exposed. It is known to coat a mat on-line after drying and to spray very light or very thin coating compositions on a wet mat before drying. These coating methods either require extra equipment and mat handling or are inadequate for heavier coatings unless the forming speed is slowed down to unacceptable levels or for coatings containing particles over certain sizes. It is also known to coat a nonwoven mat, usually in a secondary operation, to seal one surface of the mat and/or to produce a smoother surface.

It would be desirable to make a mat having a smooth and less permeable surface at normal mat forming speeds without having to add equipment to the machine above the formed mat where it gets dirty and is difficult to clean without getting foreign material into the mat being produced and without adding substantial additional processing operations to the nonwoven mat processes and lines. While gypsum board faced with fiber glass mats has performed well in the past, it is desirable to hide the glass fibers better to prevent the fibers at the surface of the mat from partly or entirely breaking loose and from presenting a rough surface; but this has not been accomplished to the degree desired prior to this invention.

SUMMARY OF THE INVENTION

The present invention includes a multiple layer fibrous nonwoven mat having a body portion, the body portion comprising a mass of nonwoven fibers, with or without particles, bonded together with a resin binder, and a surface portion containing fibers and/or particles bonded together with the same said resin binder, the surface portion being substantially-different than the major or body portion of the nonwoven mat. The body portion makes up a major portion of the basis weight (weight per unit area) of the mat while the surface portion makes up a minor portion of the basis weight of the mat. The fibers used for the surface portion are preferably shorter than one-quarter inch and longer than 100 microns.

Particles, when used in the surface portion according to this invention, are preferably sized so that less than a few percent, preferably less than one wt. percent of the particles will pass through the openings between the fibers in the nonwoven mat. The smaller the diameter of the fibers in the body portion the smaller the openings in the body portion and the smaller the particles and fibers that can be used in the surface portion. Preferably, the particles are within the size range of minus 40 and plus 100 U.S. standard mesh and can be of a lower bulk density than water. If the particles are too small, too many will flow part way or all the way through the body portion of the mat which is less desirable. It is permissible for some or a small portion of particles to flow into at least an interface portion of the body portion of the mat. This latter embodiment produces a better bond between the two layers, the body portion and the surface portion, and also helps to reduce the permeability of the layered mats. The surface portion of the mat of the present invention has a substantially lower permeability or pore size, or both, than the body or major portion of the fibrous nonwoven mat. An exposed surface of the surface portion can also be substantially smoother than an exposed surface of the body portion of the fibrous nonwoven mat. Preferably, at least 99 percent of the particles or fibers in the binder put onto the mat end up in the surface portion layer of the multiple layer nonwoven mat. Preferably the multiple layer mats of the present invention have two layers, a body portion layer and a surface layer portion.

The invention also includes a method of making the fibrous nonwoven mat described above comprising dispersing fibers, such as glass fibers, in an aqueous slurry, collecting the dispersed fibers onto a moving permeable support to form a fibrous nonwoven layer, removing excess water from the fibrous nonwoven layer, applying an aqueous resin latex binder containing particles and/or fibers to the top surface of the rapidly moving wet nonwoven fibrous layer, removing excess latex or aqueous resin, drying the nonwoven mat and curing the resin binder to form a nonwoven mat having a surface layer that differs substantially from the fibrous nonwoven body of the mat. The aqueous resin binder can also be foamed before using.

DETAILED DESCRIPTION OF THE INVENTION

It is known to make reinforcing nonwoven mats from glass fibers and to use these mats as substrates in the manufacture of a large number of roofing and other products. Any known method of making nonwoven mats can be used in this invention, such as the conventional wet laid processes described in U.S. Pat. Nos. 4,129,674, 4,112,174, 4,681,802, 4,810,576, and 5,484,653, the disclosures of each being hereby incorporated herein by reference. In these processes a slurry of glass fiber is made by adding glass fiber to a typical white water in a pulper to disperse the fiber in the white water and to form a slurry having a fiber concentration of about 0.2–1.0 weight %, metering the slurry into a flow of white water to dilute the fiber concentration to 0.1 wt. percent or less, and continuously depositing this mixture onto a moving screen forming wire to dewater and form a wet nonwoven fibrous mat. This wet nonwoven mat is then conveyed through a binder application where an aqueous resinous binder is applied in excess, the surplus is removed by suction and the wet, bindered mat is then dried and the binder cured to form a nonwoven mat product.

The method of the present invention comprises a modification to the binder preparation portion of otherwise conventional mat making processes. Most nonwoven mat processes and forming machines are suitable for modification and use with the present invention, but preferred are the wet laid nonwoven mat processes and machines wherein an aqueous slurry containing fibers is directed onto a moving permeable screen or belt called a forming wire to form a continuous nonwoven wet fibrous mat.

Figure 1:
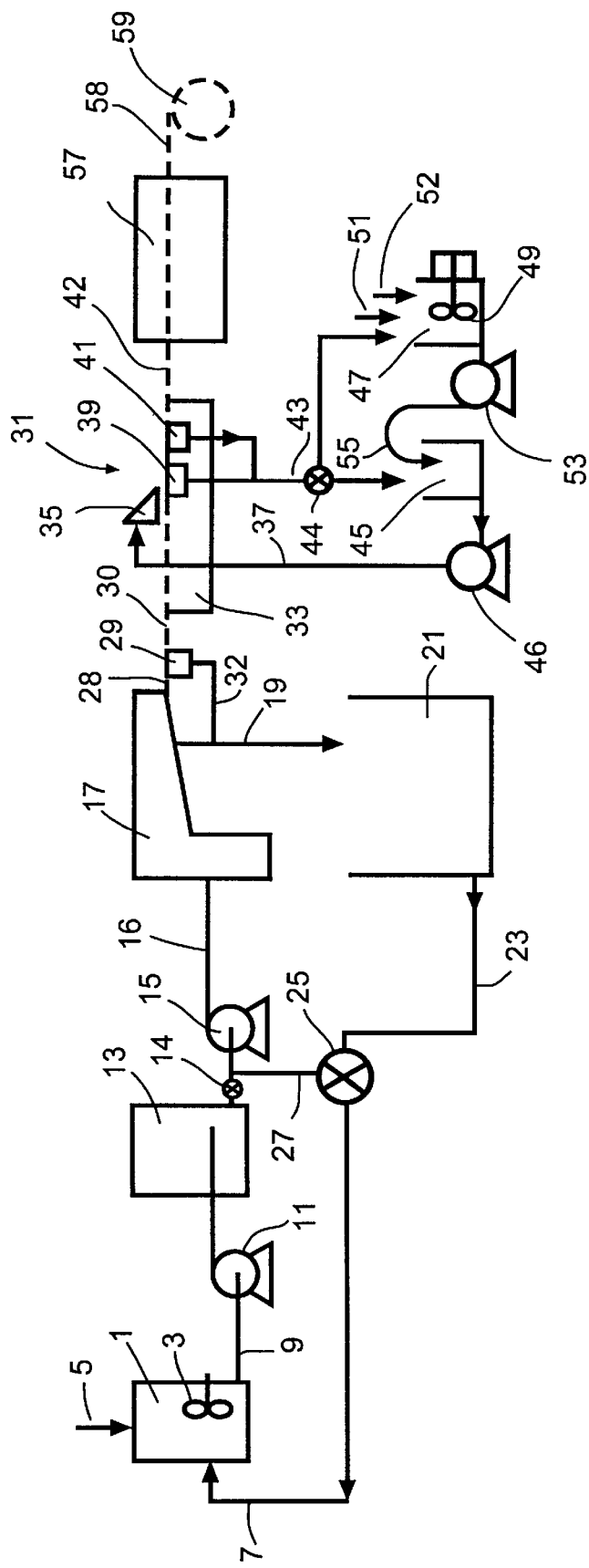
FIG. 1 is a schematic of a conventional wet mat process having an optional binder mixing tank, according to the present invention.

FIG. 1 is a schematic of a preferred wet laid system for practicing the invention. Fibers 5 are fed continuously at a controlled rate into a pulper 1 along with a conventional whitewater through a pipe 7, also continuously and at a controlled rate. An agitator 3 in the pulper 1 mixes and disperses the fibers in the whitewater. The resultant concentrated fibrous slurry flows continuously through a pipe 9 into an optional pump 11 which pumps the concentrated slurry into a fiber slurry holding tank 13. The concentrated fiber slurry is preferably metered continuously from the holding tank 11 with a valve 14 and into a metered flow of desired whitewater 27 to form a diluted fibrous slurry. The valve 25 meters a correct rate of desired whitewater to the pulper 1 via pipe 7 and a correct rate of desired whitewater 27 to form the diluted fiber slurry. The diluted fibrous slurry flows into pump 15 and is pumped to the mat forming machine 17, which can be of any width and typically is wide enough to make a finished mat 12 feet wide or wider. Alternative forming methods for making the body portion of the nonwoven mat include the use of well known paper or board making processes such as cylinder forming, dry forming or air laid, etc.

The preferred processes for the production of mats of the present invention are those known processes using mat forming machines 17 like a Hydroformer™ manufactured by Voith-Sulzer of Appleton, Wis., or a Deltaformer™ manufactured by North County Engineers of Glens Falls, N.Y. In these machines, the diluted fiber slurry flows horizontally against an inclined moving permeable belt or forming wire (not shown) where the fiber is collected and builds up in a random pattern to form a wet mat 28 while the whitewater passes through the forming wire becoming somewhat foamy (due to contained air) and is transported to a deairing tank 21 via pipe 19. The wet mat is dewatered to the desired level with a suction box 29, and the foamy whitewater removed is piped through pipe 32 to the deairing tank 21, preferably via the pipe 19.

This wet nonwoven layer of fiber 30, the body portion, is then preferably, but not necessarily, transferred to a second moving screen 33 and run through a binder application saturating station 31 where an aqueous binder is applied to the mat in any one of several known ways. According to the method of the invention this aqueous binder will also contain a significant amount of particles and/or fibers that are larger than pores or openings between the fibers in the wet nonwoven mat. A binder slurry is pumped at a controlled rate from a binder slurry holding tank 45 via a controlled rate pump 46 such that more binder than is needed is fed through a pipe 37 to a binder applicator 35 where the binder slurry is applied in excess to the wet mat body portion 30.

The binder slurry is prepared by feeding an aqueous resin binder 52 at a desired rate and fibers, particles or both 51 to a binder mix tank 47 having an agitator 49 therein to disperse the fibers, particles or both 51 in the aqueous binder 52. The binder slurry is then pumped to the binder holding tank 45 with a metering pump 53 and pipe 55. The metering pump 53 speeds up and slows down with the speed of the mat line or windup 59. The metering pump 53 is also controlled to provide the desired thickness of the surface portion of the two layered mat. The resin content in the binder slurry and the degree of vacuum in the suction boxes 39 and 41 are varied to control the binder resin content of the body portion and the surface portion of the two layered mat. The binder slurry can be prepared continuously or in batches as is well known. When prepared continuously, all ingredients, of the slurry are carefully metered in known ways to insure that the desired composition of the finished mat is maintained.

Figure 2:
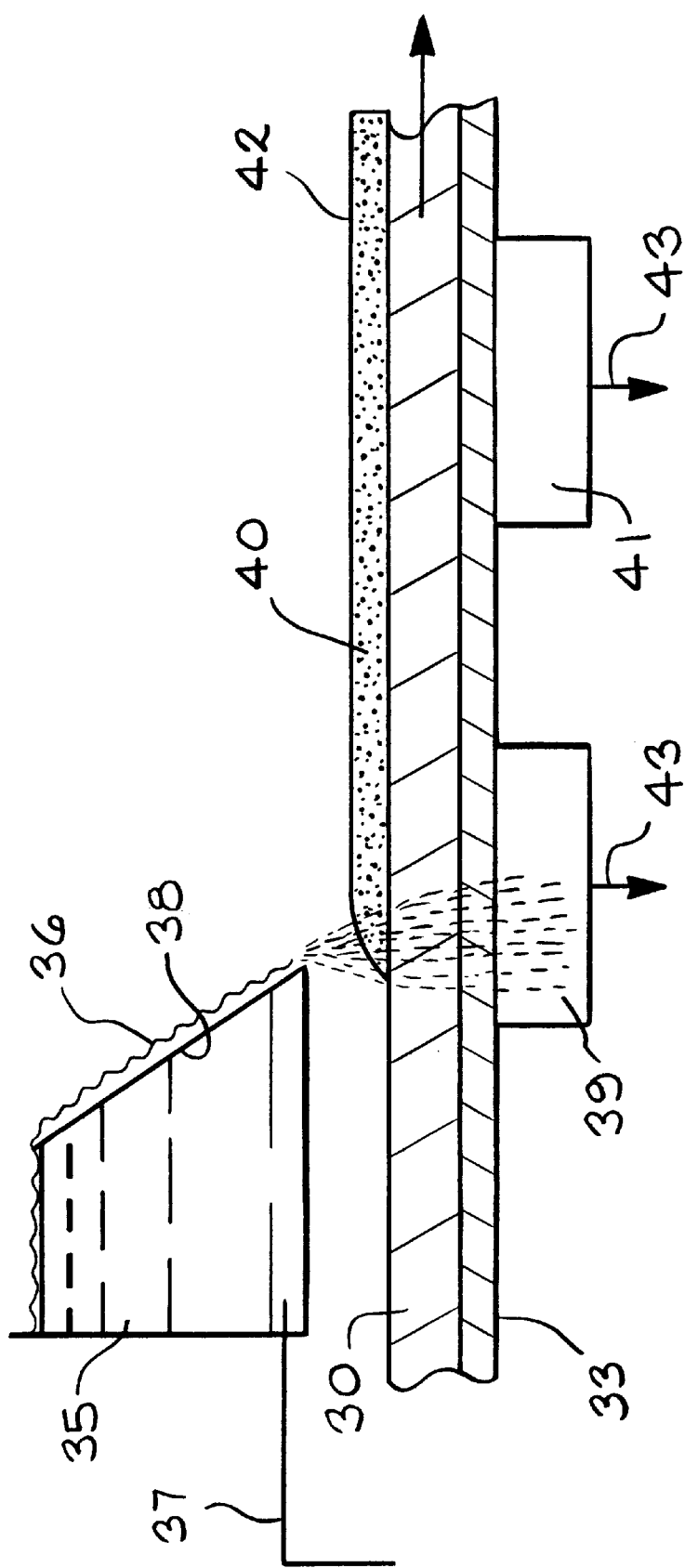
FIG. 2 is a schematic cross section of a portion of the process of FIG. 1 showing the binder application portion and the practice of the present invention to make mats of the present invention.

When the aqueous binder slurry is applied to the wet nonwoven mat or body portion 30, the particles and/or fibers therein will build up a surface portion 40 (FIG. 2) on the binder application side of the wet nonwoven body portion 30 while the aqueous resin binder portion of the binder slurry will saturate both the surface portion 40 and the body portion 30, the original wet nonwoven fibrous layer, of the resulting wet nonwoven mat. Preferably, excess aqueous binder slurry is applied using a curtain coater, such as supplied by North County Engineers of Glens Falls, N.Y. but other known methods of application and equipment that will handle the particles and/or fibers in the binder and that will apply this at the rate required to the top of the wet body portion of the mat will work. As shown in FIG. 2, the binder slurry flows over a lip of an inclined surface 38 of a curtain coater type of binder applicator 35 and onto the body portion 30 building up a surface portion 40 of fibers and/or particles 52 that were in the binder slurry. As shown, the aqueous binder portion also flows into the body portion 30 also coating the fibers in the body portion 30 and the excess aqueous binder portion flows out of the body portion 30, through the permeable belt 33 and into a first suction box 39. The binder saturated mat is then run over one or more suction boxes 41 while still on the moving permeable belt 33 to remove excess binder and water which is returned to the binder mix tank 47, and/or to the binder holding tank 45, via pipe 43.

The wet, bindered nonwoven mat 42 is then transferred to a moving conventional permeable, oven belt (not shown) and run through an oven 57 to dry the wet mat 42 and to cure (polymerize) the polymeric based resin binder which bonds the fibers, and particles when particles are present in the surface portion, together forming the finished inventive mat 58 which can be wound into a roll 59 using conventional mat winding equipment. When the fibers and/or particles in the surface portion are of an organic thermoplastic or a flowable thermoset, it is often desirable to heat the dry mat to a temperature that will fuse and flow the fibers and/or particles together into a layer having a relatively smooth surface.

The body portion of the mats of the present invention preferably contain about 80–99.5 wt. percent of the total weight of fibers, and particles when particles are present, in the dry, finished nonwoven mat with the particles and/or fibers in the surface portion of the mat being about 0.5–20 wt. percent of the fibers and particles in the dry, finished nonwoven mat. The resin binder content of the mat can vary greatly, but usually is about 5–35 wt. percent of the nonwoven mat.

Preferably, the majority of the fibers are glass fibers and most preferably all the fibers are glass fibers, but this invention is equally applicable to ceramic, natural and polymer fiber nonwovens and to nonwovens made from mixtures of any combination of these types of fibers. The fibers used in the nonwoven body portion should be at least 0.25 inch long or longer, more preferably at least one-half inch or three-quarters inch long and most preferably at least about one inch long, but mixtures of fibers of different lengths and/or fiber diameters can be used as is known. It is preferred that these fibers be coated with a silane containing size composition as is well known in the industry.

The glass fibers can be E, C, T, S or any known type glass fiber of good strength and durability in the presence of moisture and mixtures of lengths and diameters. The preferred fibers are K or M 137 and K or M 117 E glass fibers available from Johns Manville International, Inc. of Denver, Col., but most any commercially wet chop glass fiber product will be suitable. While the majority of the fibers are glass fibers in the preferred body portion, a minor portion of non-glass fibers can also be included, such as man made or natural organic fibers like Nylon™, polyester, polyethylene, polypropylene, cellulose or cellulose derivatives, etc.

The binder used to bond the fibers together can be any binder capable of bonding the fibers together. A wide variety of binders are used to make nonwovens with urea formaldehyde (UF), melamine formaldehyde (MF), polyester, acrylics, polyvinyl acetate, UF and MF binders modified with polyvinyl acetate and/or acrylic are typically used.

After the binder is applied and adjusted to the desired level with one or more suction boxes, the wet, bindered mat is transferred to an oven belt or wire and the mat is dried and the binder is cured to form the finished mat. The mat is heated to temperatures of up to about 500 degrees F. in the oven, depending on the type of binder used and/or the nature of the particles and/or fibers in the surface portion.

The particles and/or fibers used to make the surface portion of the two layered mat should not be soluble in the aqueous resin binder slurry, but could be slightly soluble. Otherwise, the particles and fibers can be of almost any material. Some examples of suitable materials are plastic particles like phenol formaldehyde, regular or modified polyethylene and polypropylene, nylon, polyvinyl alcohol, glass beads or microspheres, expanded clay, mica, flake glass, raw or expanded vermiculite, raw or expanded perlite, clay, organic or inorganic powders, microfibers, mineral wool, and the like.

One preferred mat has a basis weight target of 1.8 pounds per 100 square feet and contains ¾ inch long 13 micron glass fibers bonded together with a known modified urea formaldehyde (UF) resin binder in the body portion and ¼ inch long 3 denier cellulose acetate fibers bonded together with the same UF resin binder in a surface portion on one side of the preferred mat. The composition targets for the mats of this preferred embodiment are about 75 wt. percent of glass fibers, 20–22.5 wt. percent of UF resin binder and 2.5–5 wt. percent of cellulose acetate fibers.

EXAMPLE 1

A fiber slurry was prepared in a well known manner by adding three-quarter inch long E glass type H 117 wet chop glass fiber from Johns Manville International, Inc. having a silane containing chemical sizing on the surface, as is well known, to a known cationic white water containing Natrosol" thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 5 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a pilot scale model of a Voith Hydroformer™ where a wet nonwoven mat was continuously formed.

The wet mat was removed from the forming wire and transferred to a curtain coater binder applicator where an aqueous binder slurry was applied to the mat. This binder slurry was made by mixing a plus 100 mesh Novolac™, a phenolic: resin powder, available from Georgia Pacific Corporation, Atlanta, Ga., with an aqueous modified UF resin. The modified resin was made by adding about 7.5 wt. percent, based on the UF solids, of Duraset™ 827, available from Franklin International of Columbus, Ohio, and about 5 wt. percent of hexamethylene tetramine as a cross linking agent to a Georgia Pacific 2928 UF resin latex containing 54–56 wt. percent solids. The amount of Novolac™ powder in the aqueous UF binder slurry was sufficient to produce a mat having a surface portion containing about 15 wt. percent Novolacu particles, based on the weight of fiber in the body portion of the mat.

The wet mat was then transferred to an oven belt and carried through an oven to dry the mat and to heat the mat to a temperature of about 350–400 degrees F. for about several seconds to cure the resin binder and to fuse and cure the Novolac™ particles. The Novolac™ particles also flowed to form a coating layer on the body portion of the two layered mat. The basis weight of the mat produced was about 1.83 lbs./100 sq. ft. The resultant two layered mat had the following properties:

| | |
|---|---|
| Thickness | 30 mils |
| Loss On Ignition | 33.4 weight percent |
| Machine Direction Tensile | 120 lbs./3 inch width |
| Cross Machine Tensile | 136 lbs./3 inch width |
| Air permeability | 565 cu. ft./min./sq. ft. |

The air permeability of this mat compares with an air perm of more than 700 on a conventional fiber glass nonwoven mat of this basis weight. The bonded Novolac™ surface portion of the mat of this example is much smoother than the opposite side of the mat; and substantially fewer of the glass fibers of the body portion are visible on the surface of the surface portion. This mat, when bonded to gypsum board such that the body portion is next to the gypsum board and the surface portion of the mat is exposed, is expected to perform functionally as well as the conventional fiber glass mats normally used on gypsum board. In addition, gypsum board faced with the mat of this example should have a more friendly feel and not cause an itching issue with the people handling and installing the faced gypsum board, which is a substantial improvement.

Similar results can be achieved with different amounts of surface layer such as when the phenolic resin powder in the surface layer ranges from about 5 to about 20 weight percent of the fiber in the body portion. Other types of phenolic resin can be used. Other types of aqueous resinous binder can also be used, especially when the mat is to be used for other applications.

EXAMPLE 2

Another mat was made in exactly the same way as in Example 1, except that three-quarter inch long K 117 fiber from Johns Manville International, Inc. was used for the body portion. The binder slurry for the mat contained one-quarter inch long 3 denier cellulose triacetate fiber (enough to produce a cellulose triacetate content, essentially all in the surface portion, in the two layered mat of about 15 wt. percent, based on the weight of glass fiber in the body portion) and the curing temperature was about 400 degrees F. The basis weight of the mat was 1.92 lbs. per 100 square feet.

The other properties were as follows:

| | |
|---|---|
| Thickness | 35 mils |
| Loss On Ignition | 31 weight percent |
| Machine Direction Tensile | 99 lbs./3 inch width |
| Cross Machine Tensile | 119 lbs./3 inch width |
| MD + CD Tear Strength (Elmendorf) | 455 grams |

This mat can be used as a facer for fiber glass insulation and for board products with the glass fiber base portion bonded to the insulation or board product and the surface portion of bound cellulose acetate fibers exposed.

EXAMPLES 3–8

Fire resistant mats, and mats having a lowered permeability, are made by using a more refractory material for the surface portion. In this example the procedure was similar to that used in Example 1 except that the binder was aqueous acrylic resins, and mica flakes of different average particle size were added to this aqueous binder in different concentrations to form binder slurries that produced two layer mats of differing thicknesses of the surface portion which produced mats having different permeabilities. First, a control mat having a basis weight of about 1.55 lbs. per 100 sq. ft. (7.04 grams/sq. ft.) was made by dispersing 0.5 inch long H 117 glass fibers having a diameter of 10 microns in the whitewater and using an aqueous acrylic resin binder to saturate the mat. Enough acrylic resin binder remained in the wet mat to produce an LOI in the dried and cured mat of about 25 wt. percent. The aqueous acrylic resin binder contained B. F. Goodrich's 26138 aqueous acrylic resin and a cross linking agent such as about 5–25 wt. percent of urea formaldehyde or melamine formaldehyde and diluted with whitewater to a solids content of about 25 wt. percent using whitewater from the wet mat machine used to form the base portion of the mat.

After forming a single layer base mat control sample, F120 mica flakes having a median particle size of 405 microns was added to the binder to form a slurry of increasing mica concentration to form two layer mats having various thicknesses of the surface layer portion and consequently increasing basis weights, and various permeabilities as follows:

| Mat Designation | Basis Wt. | Air Perm. (CFM/Sq. Ft.) |
|---|---|---|
| Control - one layer | 7.04 g/sq. ft. | 580 |
| 3-First two layer mat | 7.27 g/sq. ft. | 560 |
| 4-Second two layer mat | 7.64 g/sq. ft. | 540 |
| 5-Third two layer mat | 9.10 g/sq. ft. | 450 |

Repeating the above procedure, but substituting V115 mica flakes having a median particle size of 550 microns produced the following mats and mat properties:

| Mat Designation | Basis Wt. | Air Perm. (CFM/Sq. Ft.) |
|---|---|---|
| Control - one layer | 7.04 g/sq. ft. | 580 |
| 6-First two layer mat | 7.87 g/sq. ft. | 580 |
| 7-Second two layer mat | 11.59 g/sq. ft. | 390 |
| 8-Third two layer mat | 18.71 g/sq. ft. | 320 |

EXAMPLES 9–11

Repeating the above procedure, but changing the acrylic resin to B. F. Goodrich's V-29 acrylic resin while keeping the same type of cross linking agent, using much finer mica flakes (C1000) having a median particle size of 26 microns, and using a combination of 86 wt. percent 0.75 inch long K117 glass fibers having an average fiber diameter of 13 microns and 14 wt. percent of code 206 TEMPSTRAN™ glass microfiber, available from Johns Manville International, Inc., produced the following mats and properties.

* Code 206 TEMPSTRAN™ is a glass microfiber having an average fiber diameter of between 2 and 3 microns.

| Mat Designation | Basis Wt. | Air Perm. (CFM/Sq. Ft.) |
|---|---|---|
| Control - one layer | 6.64 g/sq. ft. | 300 |
| 9-First two layer mat | 8.2 g/sq. ft. | 90 |
| 10-Second two layer mat | 8.8 g/sq. ft. | 70 |
| 11-Third two layer mat | 9.4 g/sq. ft. | 30 |

EXAMPLES 12 AND 13

These examples were similar to Examples 3–8 except that a mixture of 87 wt. percent of Johns Manville's 0.5 inch K117 wet chop glass fiber having an average fiber diameter of 13 microns and 13 wt. percent of Johns Manville's Code 206 TEMPSTRANM microfibers was used to make the control mat and the base portion of the two layered mats. Another difference was that enough of the aqueous acrylic binder was left in the mat to produce an LOI of about 35 wt.

percent. A 100K mica flake product having a median particle size of 81 microns was added to the binder in different concentrations to make different two layered mats. In these examples the basis weight of the mats was kept to 8+/−0.25 by reducing the weight of the glass fibers and binder in the base portion of the mat in an amount similar to the basis wt. of the mica flakes and the binder in the surface portion of the two layered mat:

| Mat Designation | Basis Wt. | Air Perm. (CFM/Sq. Ft.) |
|---|---|---|
| Control - one layer | 8.26 g/sq. ft. | 140 |
| 12-First two layer mat | 7.73 g/sq. ft. | 120 |
| 13-Second two layer mat | 8.13 g/sq. ft. | 77 |

Examples 3–13 show that this invention can be used to reduce the permeability of nonwoven mats substantially, and below prior art levels, and with a fire resistant material producing a fire. resistant mat of two or more layers in a novel, convenient and economical manner. Many other combinations of materials and two-layered products, or products containing two-layered mats, made using this novel method suggest themselves to the skilled artisan. By using a B stagable aqueous resin binder such as aqueous melamine formaldehyde, phenol formaldehyde or furfuryl alcohol formaldehyde binders instead of the acrylic or other resins mentioned above, and B staging the mat during initial curing, the resultant two layered mats can later be molded hot to make a three dimensional shape and to finish the cure of the resin binder. with sufficient hot molding pressure, the permeability of the mat will be reduced substantially further than that of the mats of Examples 3–13.

The two layered mats can be bonded to a combustible material, like a wood product such as hardboard, particle board, chip board, oriented strand board or plywood with any known adhesive fire resistant adhesive with the body portion of the mat against the combustible material and the mica surface portion exposed by hot pressing at a suitable temperature to fully cure the binder or the adhesive and a pressure sufficient to form the two-layered mat into the desired shape of the mat. This two layered mat facing will increase the time it takes for a fire to burn through the combustible material substantially and allow less expensive materials to pass the fire code tests where they wouldn't pass otherwise. The two layered mats of the present invention can also serve as facers for insulation materials such as fiber glass, mineral wool, ceramic wool, etc. and will also increase the fire resistance and strength of those materials, particularly fiber glass insulation.

Instead of mica flakes, raw or exfoliated vermiculite particles, raw or expanded perlite particles, refractory microbaloons, raw or expanded clay, and other refractory powders can be used to make fire resistant mat facers. Also, melamine iformaldehyde resin binder can be used instead of the furfuryl alcohol formaldehyde resin. An abrasive facing can be made by using abrasive particles or fibers to form the surface portion.

While the preferred embodiments of the invention have been disclosed in detail, other embodiments within the described invention and having other functional additives known or obvious to those skilled in the art are considered to be part of the present invention and are intended to be included in the invention claimed below.

What is claimed is:

1. A multiple layer mat comprising a fibrous nonwoven body portion and a surface portion, said body portion and said surface portion comprising fibers and/or particles, the fibers in the body portion and the fibers and/or particles in the surface portion being bonded together with a same resinous binder, the binder content of the mat being between 5 and 35 weight percent of the multiple layer mat, the resinous binder having been applied as an aqueous slurry wherein the fibers and/or particles in the surface portion were applied as part of the binder slurry, the amount of fibers and/or particles in the surface portion being about 0.5–20 wt. percent of the fibers in the body portion of the mat and wherein the fibers a and/or particles in the slurry and in the surface portion are large enough that more than 99 percent of these particles and/or fibers are larger than the openings between the fibers in the body portion.

2. The mat of claim 1 wherein the surface portion contains fibers of one-quarter inch length or shorter. but longer than about 100 microns and selected from the group consisting of glass or polymer microfibers, cellulose triacetate fibers, mineral wool fibers and ceramic fibers or whiskers.

3. The mat of claim 1 wherein the surface layer contains particles larger than 100 mesh selected from the group consisting of phenol formaldehyde, regular or modified polyethylene and polypropylene, nylon, polyvinyl alcohol, hot melt and reactive hot melts, glass beads, flakes or microspheres, expanded clay, mica flakes, abrasive particles, diatomaceous earth, raw or expanded vermiculite, raw or expanded perlite, clay, organic or inorganic powders, micro-balloons, microfibers, mineral wool and expanded clay aggregate.

4. A laminate comprising a substrate and a multiple layer mat, the multiple layer mat having a surface portion of material bonded to a body portion of the multiple layer mat, said surface portion and said body portion containing fibers and/or particles, the fibers in the body portion and the fibers and/or particles in the surface portion being bonded together with a same resinous binder, said resinous binder having been applied in an aqueous solution slurry containing said fibers and/or particles, the fibers and/or particles in the slurry and surface portion being of a size large enough that at least about 99 percent of these particles and/or fibers are larger than the openings between the fibers in the body portion.

5. The laminate of claim 4 wherein said particles and/or fibers are selected from a group consisting of phenol formaldehyde, regular or modified polyethylene and polypropylene, nylon, polyvinyl alcohol, hot melt and reactive hot melts, glass beads, flakes or microspheres, expanded clay, mica flakes, abrasive particles, diatomaceous earth, raw or expanded vermiculite, raw or expanded perlite, clay, organic or inorganic powders, micro-balloons, microfibers, mineral wool and expanded clay aggregate.

6. The laminate of claim 5 wherein the substrate is a combustible material.

7. The laminate of claim 6 wherein the combustible material is a wood product selected from the group consisting of hardboard, particle board, chip board, organic ceiling tile, plywood and oriented strand board.

8. The laminate of claim 5 wherein the substrate is selected from the group consisting of fiber glass insulation, ceramic fiber insulation, and mineral wool.

* * * * *